US012480900B1

United States Patent
Duzik et al.

(10) Patent No.: US 12,480,900 B1
(45) Date of Patent: Nov. 25, 2025

(54) CRYOGENIC PROPERTY TEST PLATFORM

(71) Applicant: Mainstream Engineering Corporation, Rockledge, FL (US)

(72) Inventors: Adam J. Duzik, Rockledge, FL (US); Gregory E. Chester, Rockledge, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 344 days.

(21) Appl. No.: 18/349,379

(22) Filed: Jul. 10, 2023

(51) Int. Cl.
  *G01N 25/14* (2006.01)
  *F17C 3/08* (2006.01)

(52) U.S. Cl.
  CPC ........... *G01N 25/145* (2013.01); *F17C 3/085* (2013.01)

(58) Field of Classification Search
  None
  See application file for complete search history.

(56) References Cited

U.S. PATENT DOCUMENTS

| | | | | |
|---|---|---|---|---|
| 6,446,444 B1 * | 9/2002 | Chase | ...................... | F02G 1/043 60/520 |
| 2002/0139902 A1 * | 10/2002 | Valentian | .................. | F02K 9/42 244/171.1 |
| 2006/0000800 A1 * | 1/2006 | Usui | ....................... | C23C 16/52 216/60 |
| 2016/0298888 A1 * | 10/2016 | Khatri | ....................... | F25B 9/02 |
| 2020/0022745 A1 * | 1/2020 | McHale | ................ | A61B 18/02 |
| 2020/0332958 A1 * | 10/2020 | Dietrich | ................... | F25D 3/10 |
| 2021/0402407 A1 | 12/2021 | Hoehne | | |
| 2023/0014966 A1 | 1/2023 | Snow et al. | | |

* cited by examiner

*Primary Examiner* — Erica S Lin (74) *Attorney, Agent, or Firm* — Michael W. O'Neill, Esq.

(57) ABSTRACT

An apparatus is disclosed for a flexible, easily reconfigured vacuum chamber capable of physical property measurement at cryogenic temperatures. The chamber is easily constructed from existing cryogenic pumps. The cryostat cold finger forms a cryogenically-cooled stage, upon which a wide variety of experiment test setups can be placed for measuring many different properties at cryogenic temperatures. The lid and feedthrough ports are reconfigurable to obtain measurements and interact with samples inside the vacuum. Attached heating elements enable testing at many possible cryogenic temperatures. The specific case of laser cooling at cryogenic temperatures is presented as an example, along with necessary lid and interior components. Viewports allow a laser beam into the chamber, while mirrors redirect this into the sample. Temperature diodes and laser power meters measure any heating or cooling effects.

1 Claim, 9 Drawing Sheets

CRYOGENIC PROPERTY TEST PLATFORM

STATEMENT REGARDING FEDERALLY SPONSORED RESEARCH OR DEVELOPMENT

This invention was made with government support under N68335-19-C-0523 awarded by United States Department of the Navy. The government has certain rights in the invention.

BACKGROUND

Physical properties such as, but not limited to, electrical conductivity, thermal conductivity, mechanical strength and ductility, heat capacity and thermal expansion are temperature dependent. Such properties will deviate from room temperature values at high temperatures and at lower and cryogenic temperatures. Measurements of high temperature properties is relatively easy, requiring a furnace and can be carried out under multiple atmospheres. Cryogenic measurements, on the other hand, are more difficult. Reaching such lower temperatures requires a cryogenic cooling system, often involving a large compressor with a cryogenic compressor with liquid nitrogen or helium. This requires a vacuum chamber to mitigate thermal leakage into the cryostat chamber and maintain cryogenic temperatures. This is a much more complicated setup than a furnace and complicates making test setups and interacting with samples under test.

Information relevant to attempts to address these problems can be found in U.S. Patent Pub Nos. US2023/0014966-A1 and US2021/0402407-A1. However, each one of these references suffers from one or more of the following disadvantages:

In US2023/0014966-A1, titled "Cryogenic wafer testing system," to Snow et al., describe an apparatus for quickly cooling semiconductor wafers to cryogenic temperatures and performing tests. This setup is inflexible, suitable only to a specific form factor (wafers) and tests (electrical measurements on semiconductor devices). The chamber is custom built, increasing expense and complexity, and lacks sufficient internal volume for flexibility. Also, the apparatus is designed with a single cryogenic temperature in mind, precluding tests at higher but still cryogenic temperatures.

In US20210402407-A1, titled "Cryostat with Improved Accessibility for Experiments," to Hochne et al., describe a collection of platforms in a vacuum chamber, where each platform is readily accessible, cooled to various cryogenic temperatures, and held under vacuum. This system is cooled by a pulse cooling system capable of millikelvin operation on one stage, but the other stages are fixed at higher temperatures. There is no way to control or adjust these temperatures for other desired values. Their apparatus is also custom built, increasing difficulty in acquisition, setup, operation and maintenance. Moreover, the platforms are enclosed in small volumes, prohibiting many kinds of experiments and test stages for performing particular experiments. Therefore, this apparatus lacks sufficient flexibility.

For the foregoing reasons, there is a need for a flexible cryogenic test stand produced from commercially-available equipment that is readily adapted for virtually any conceivable cryogenic physical property measurement need.

SUMMARY

The present invention is a modular apparatus for measuring physical properties at cryogenic temperatures. Particularly, the present invention is concerned with measuring laser-induced temperature changes in a sample or object under test (OUT) at cryogenic temperatures, utilizing standard vacuum hardware rather than custom built equipment. A standard cryogenic pump is refitted to transform the central cold finger into a test platform. Heating elements on the cold finger underneath the top platform enables equilibrium temperatures at a variety of cryogenic temperatures, particularly in the range of 4-77K, or the temperatures of liquid helium and nitrogen, respectively. This does not imply the present invention is restricted to those temperatures; higher cryogenic temperatures are also accessible. The cold finger test platform can be easily adapted for a wide variety of measurement setups, capable of measuring desired physical properties at cryogenic temperatures. Likewise, the sealing lid and feedthrough ports are reconfigurable. As an example, laser cooling is presented in the disclosed invention. Diodes independently measure the object under test viz-a-viz the chamber cold finger to see heating or cooling effects on the object under test. Temperature changes can be produced by, but not limited to, laser cooling or heating, electrical heating and magnetic interactions.

The first aspect of the disclosed invention is an object under test (OUT) is first cryogenically cooled in vacuum with a traditional cryostat cold finger, then the heating or cooling method under consideration applied to the OUT. A second aspect of the disclosed invention is a high thermal resistivity insulator separates the OUT and the cold finger. This prevents the cryostat cooling effects from immediately overwhelming any heating or cooling effects from the method under test (MUT). A third aspect of the disclosed invention is various ports on the vacuum chamber permit introduction of electrical, optical and mechanical means of interaction with the OUT.

The disclosed invention is a cryogenic property test platform for testing physical properties of samples at cryogenic temperatures, comprising a vacuum chamber including body and lid and the lid including an introduction viewport, an exit viewport, and a centered viewport; a frame including a plurality of rods and a plurality of rings secured to the plurality of rods, wherein the frame fits within the body; a cold finger having a column, no charcoal arrays, and an internal cryogen loop; band heaters attached to the column; a sample stage in alignment with the center viewpoint and including a sample block for a sample to be placed thereon and the sample block having a hole therein, an insulator adjacent the sample block and in contact with the cold finger, a parabolic mirror to direct light through the center viewport, a cold finger temperature diode inserted into the hole, a collar, and a light funnel between the collar and the insulator block, wherein both the collar and funnel have apertures to permit a second diode to be placed in the chamber and measure temperature effects in comparison to the cold finger temperature diode; a first mirror and second mirror both secured to one of the rings on the frame, wherein the first mirror is positioned to reflect a laser beam passing through the introduction viewport into a sample on the sample block and then reflecting off the second mirror into passing through the exit viewport; and a first light meter positioned above the centered viewpoint and a second light meter positioned at the exit viewpoint to measure the power transmitted through the sample and the power emitted from the sample, respectively.

BRIEF DESCRIPTION OF THE DRAWINGS

These and other features, aspects, and advantages of the present invention will become better understood with regard to the following description, appended claims, and accompanying drawings where:

DESCRIPTION

In the Summary above and the Description, and the claims below, and in the accompany drawings, reference is made to particular features (including method steps) of the invention. It is to be understood that the disclosure of the invention in this specification includes all possible combinations of such particular features. For example, where a particular aspect or embodiment of the invention, or a particular claim, that feature can also be used, to the extent possible, in combination with and/or in the context of the other particular aspects and embodiments of the invention, and in the invention generally.

Figure 1:
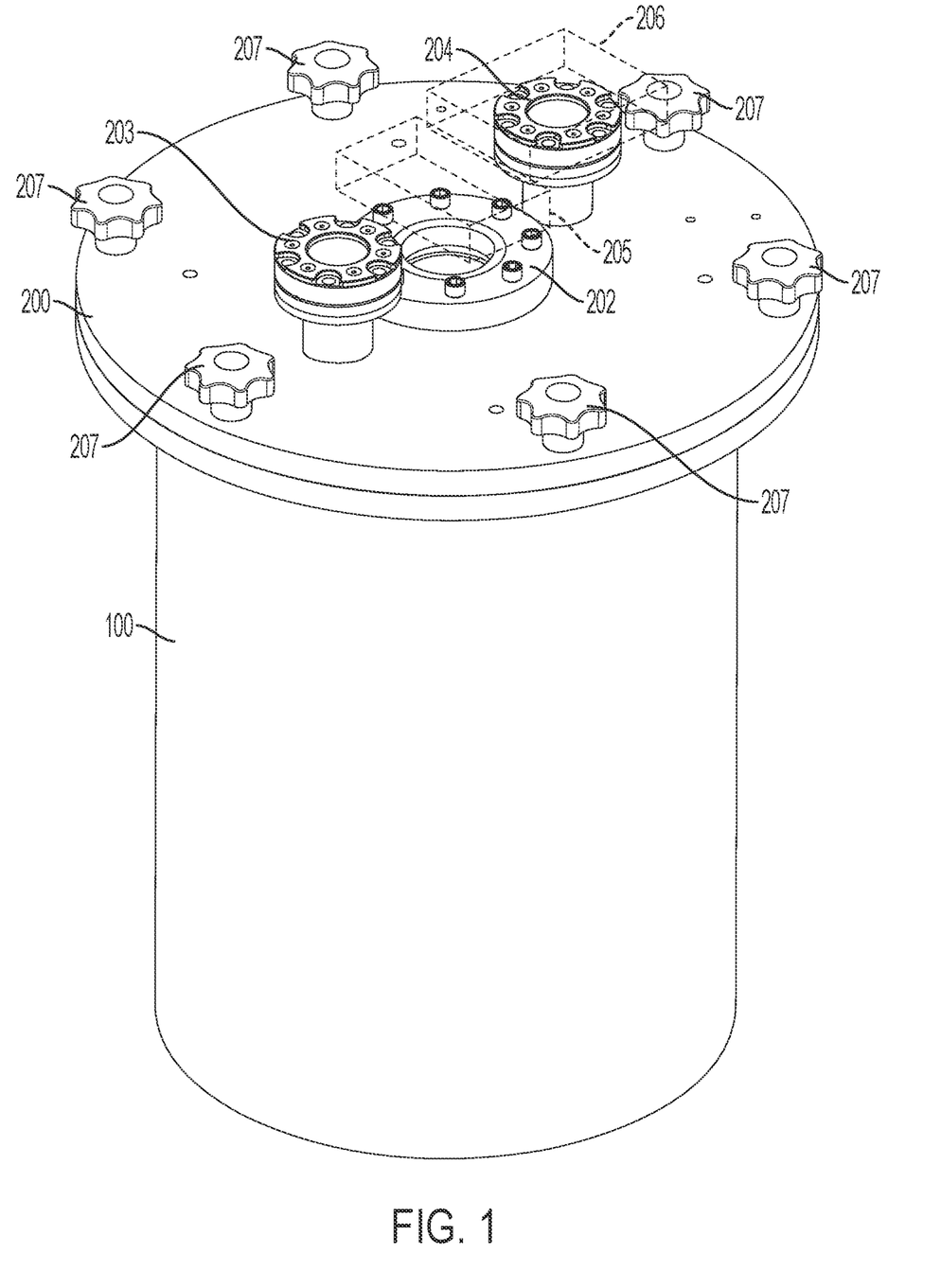
FIG. 1 shows an isometric exterior view of the test stand.
Figure 6:
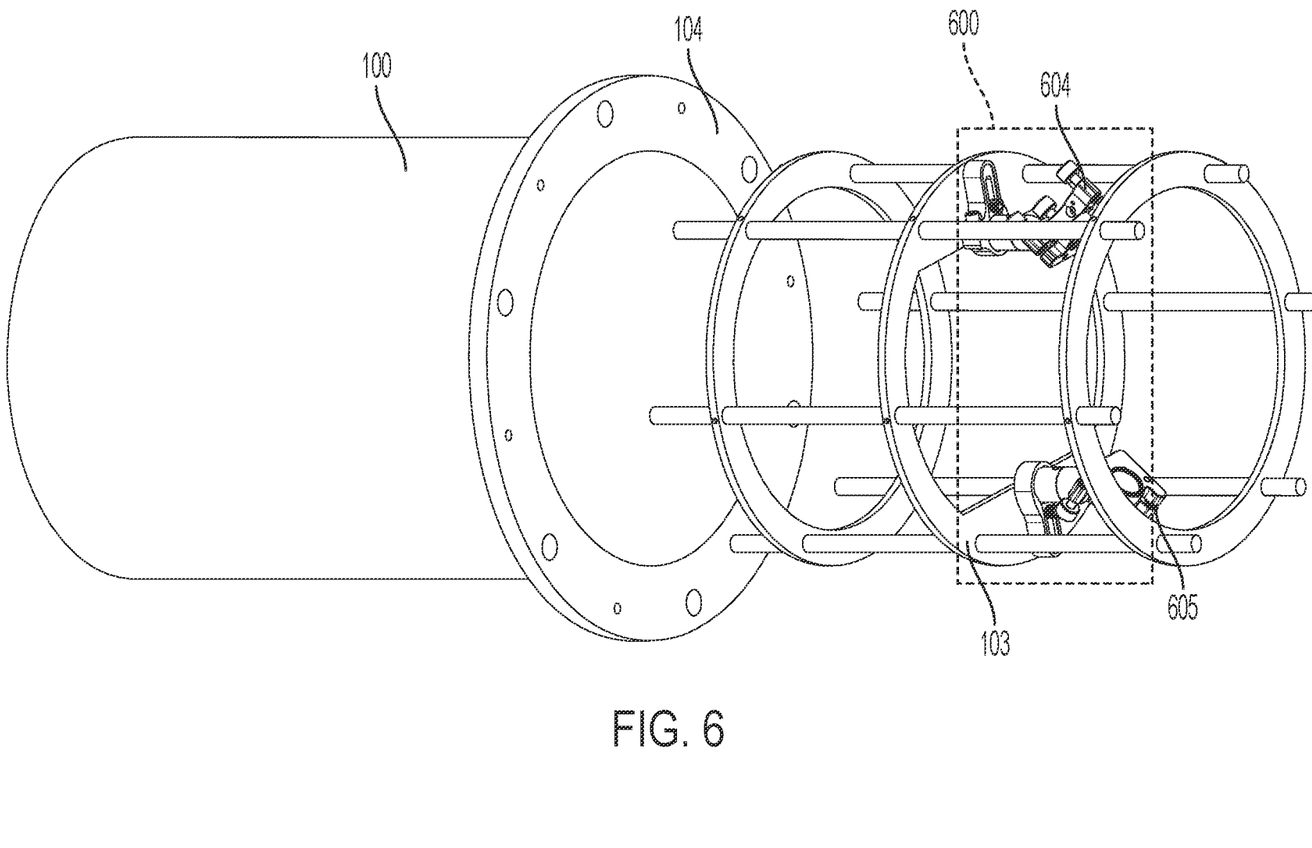
FIG. 6 is an exploded view of the test stand outside of the vacuum chamber.

Now referring to FIG. 1, the major components of the invention are depicted. The main vacuum chamber (100) is a standard cryogenic pump chamber, often referred to as a bell jar due to its shape. The chamber (100) is constructed from standard stainless steel designed for vacuum and cryogenic pump operation. The vacuum chamber lid shown in FIG. 1 (200) is a stainless steel plate with any desired number of viewports and feedthroughs welded, bolted or otherwise attached with vacuum-tight seals. The lid itself is sealed to the main vacuum chamber body (100) with standard vacuum gasket methods, such as, but not limited to, O-rings and metal gaskets. After the lid (200) is sealed to the vacuum chamber body (100), the chamber volume is evacuated of air using a standard pumping system (not shown), consisting of turbomolecular, diaphragm, rotary vane, or other appropriate means of removing gases from a vacuum chamber through a port on the vacuum chamber body (100) or the lid (200) as desired. Frame (103) is constructed from a plurality of rods and rings that are secured to the rods as shown in FIG. 6, e.g. fasteners. In the present depiction, a port for evacuation (102) is located on the bottom of the vacuum chamber body (100), but this does not imply limitation or requirement this must be so for the invention to function.

Figure 2:
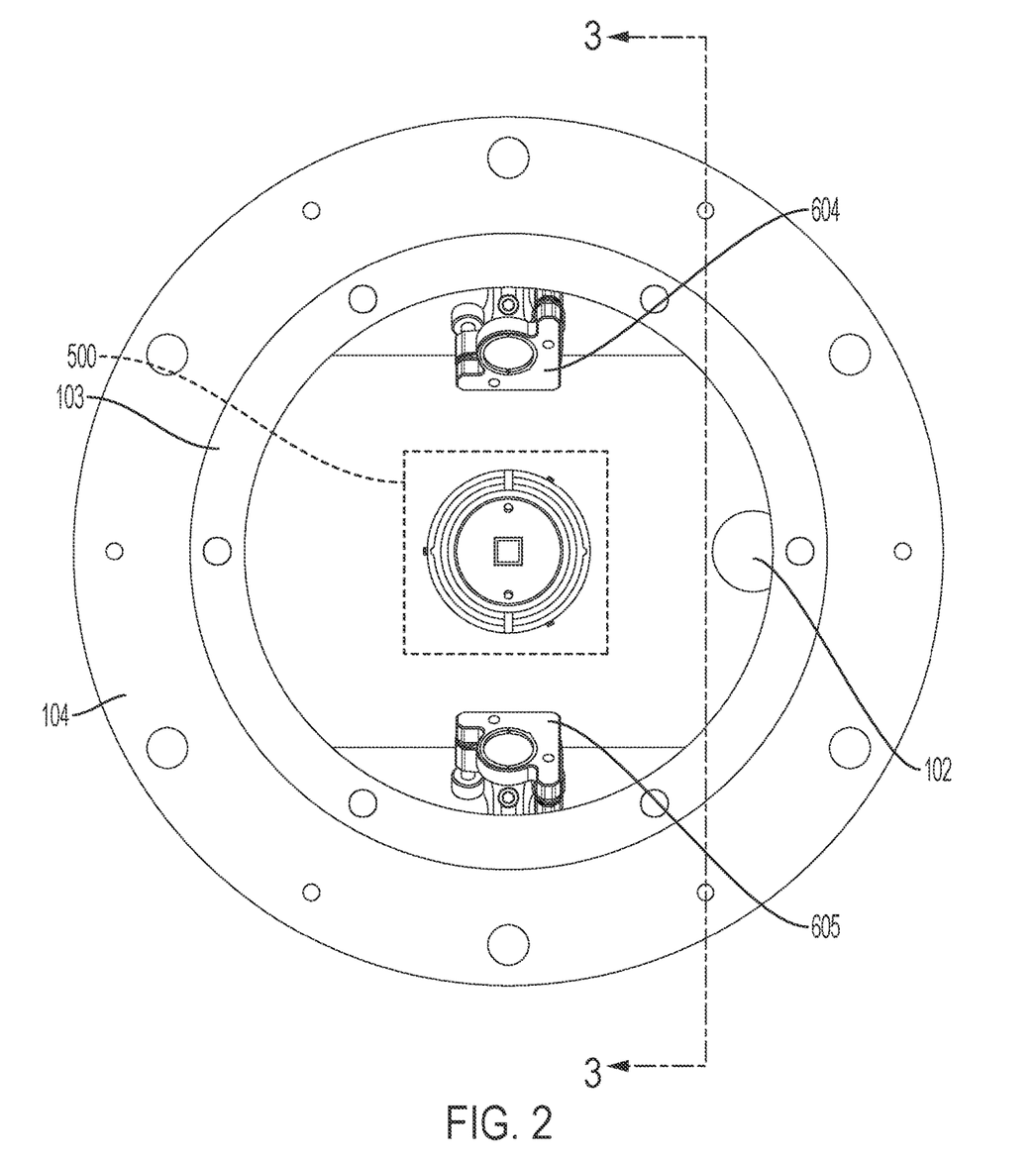
FIG. 2 is a top-down view of the bell jar stand with the lid removed.
Figure 3:
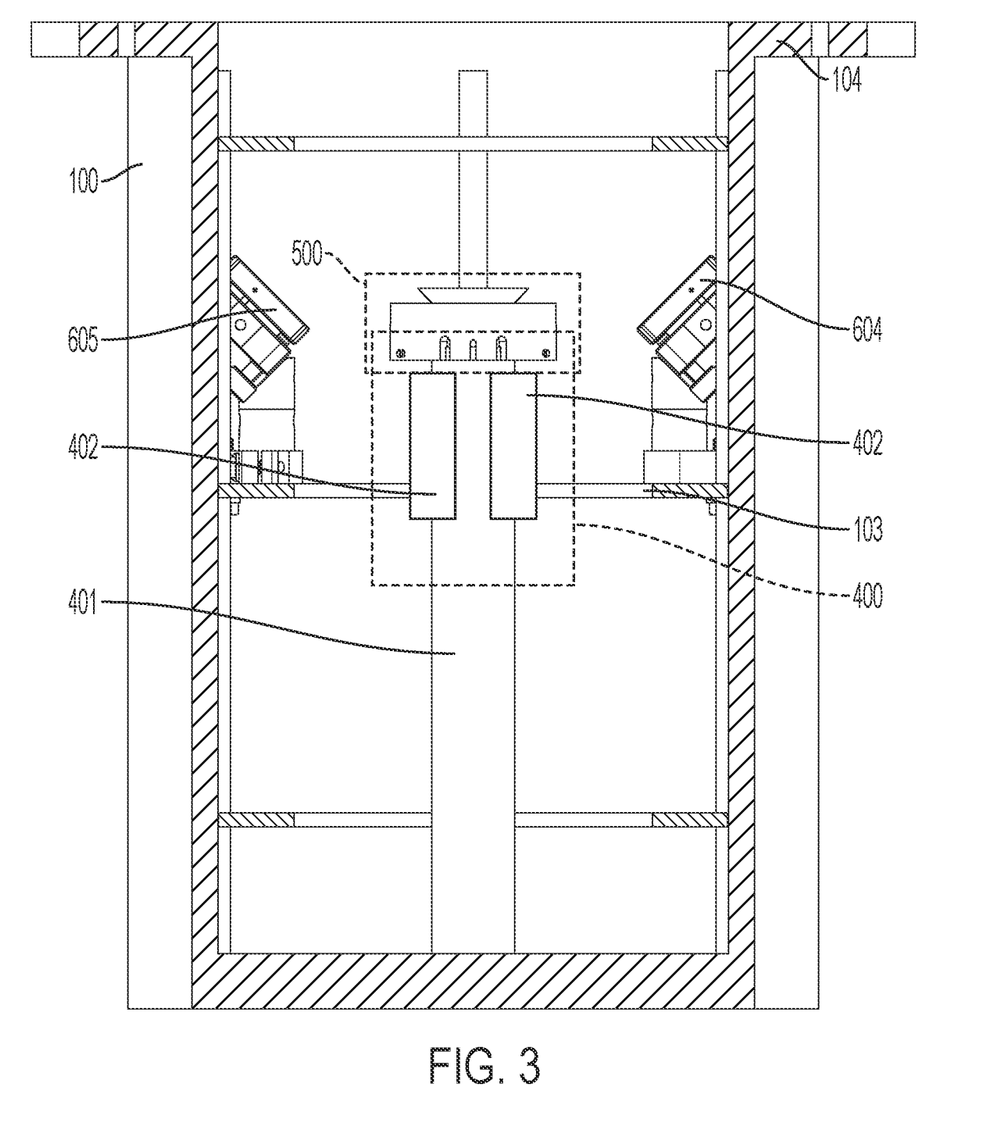
FIG. 3 is a sectioned side view of the bell jar interior with the components therein.
Figure 4:
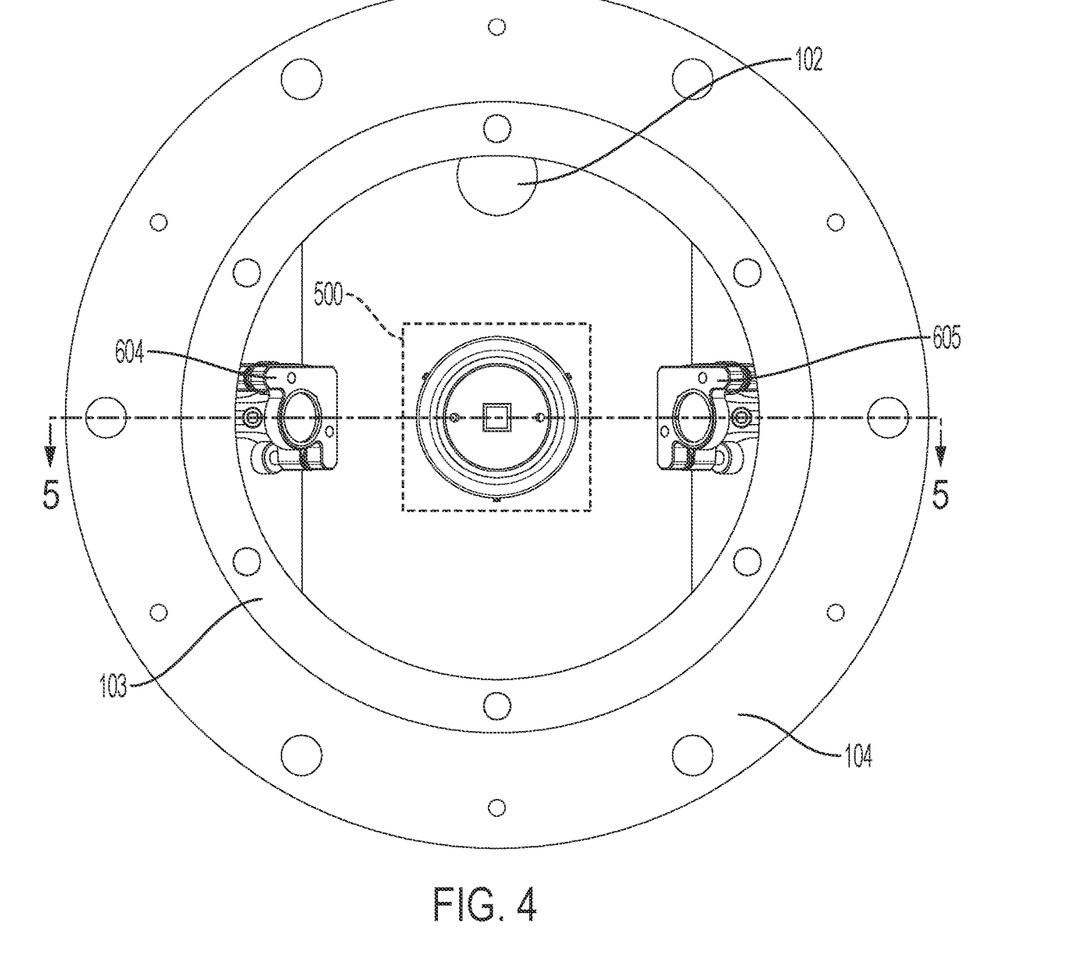
FIG. 4 is another top-down view of the bell jar interior, with the sections for FIG. 5. The central light funnel is now included, unlike in FIG. 2.

Now referring to the internals of the vacuum chamber shown in FIG. 2 (100), there are 3 main components: the stage temperature control system (400) (see FIG. 3), the sample stage (500) and the laser management system (600) (See FIG. 4). Of the stage temperature control system (400), the cryogenic cold finger (401) is part of a standard cryogenic pump, usually with charcoal arrays attached to maximize surface area for gas molecule adsorption. These arrays are removed for transforming the cryopump into the enclosed invention. This leaves a platform, usually copper covered in a layer of indium foil for cryogenic thermal conductivity, at the top to become the sample stage (500). This is more clearly shown in the sectional views illustrated in FIG. 3 and FIG. 5. The chamber remains under vacuum during operation; this is vital to ensuring the cryogenic system operates correctly. The cold finger (401) contains an internal cryogen loop, through which the compressor cycles cryogenically cooled liquids, usually liquid helium or liquid nitrogen. The loop carries away heat from the cold finger, especially at the top plate. Vacuum conditions are vital to maintaining cryogenic temperatures, as vacuum is the best thermal insulator known. If the chamber contained a gas atmosphere, the convection losses would be too severe to establish cryogenic temperatures.

Figure 5:
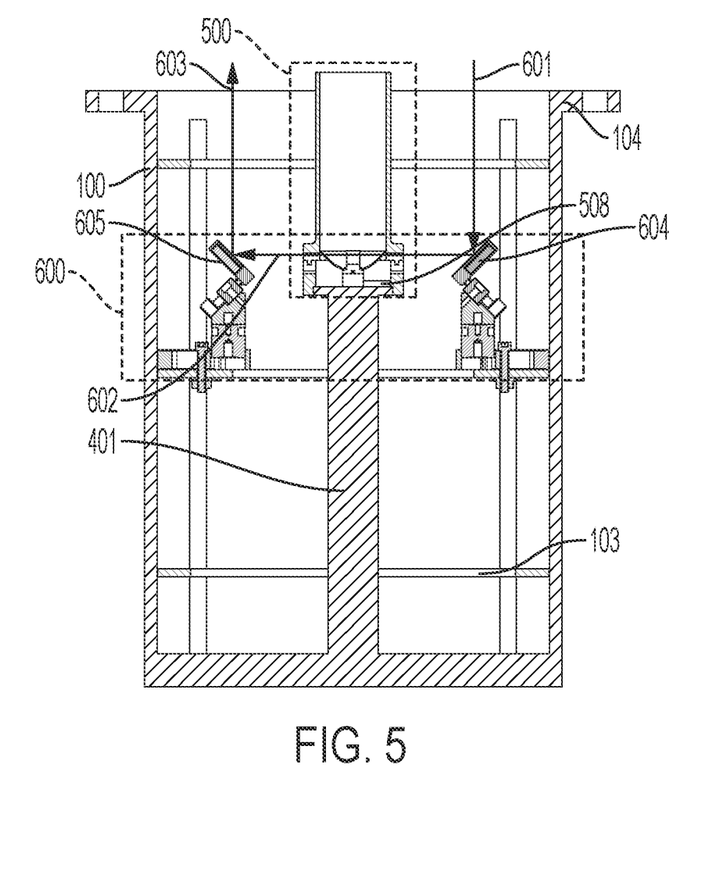
FIG. 5 is a sectioned side view of the bell jar interior components, with the light funnel installed.

Underneath the sample stage (500), curved band heaters (402) are clamped or otherwise attached to the cold finger column. The heaters are electrically powered with a power supply (not shown), suitable for controlling cryogenic temperature. A typical cryogenic pump has no temperature control; the compressor simply goes to the lowest possible temperature. The band heaters (402) adds controlled amounts of heat to the cold finger (401) to raise temperature from the minimum to any cryogenic temperature required. A proportional-integral-differential (PID) controller maybe be added, according to standard practice, to precisely control cryogenic temperature with a feedback loop between temperature measurement and power output. The sample stage is highly reconfigurable and modular, able to accommodate many different custom test platforms for measuring any desired physical property at cryogenic temperatures. For the present invention, laser-induced temperature change in a target sample is the property of interest, but this does not preclude or limit the invention from other uses or configurations from other measurement setups. In the depicted setup, the laser management system (600) consists of mirrors for directing laser light to and from the viewports on the lid (200) and through the sample. Apertures and holes are introduced into any shrouds or covers on the sample stage, in order to permit the laser light through to the sample.

Figure 7:
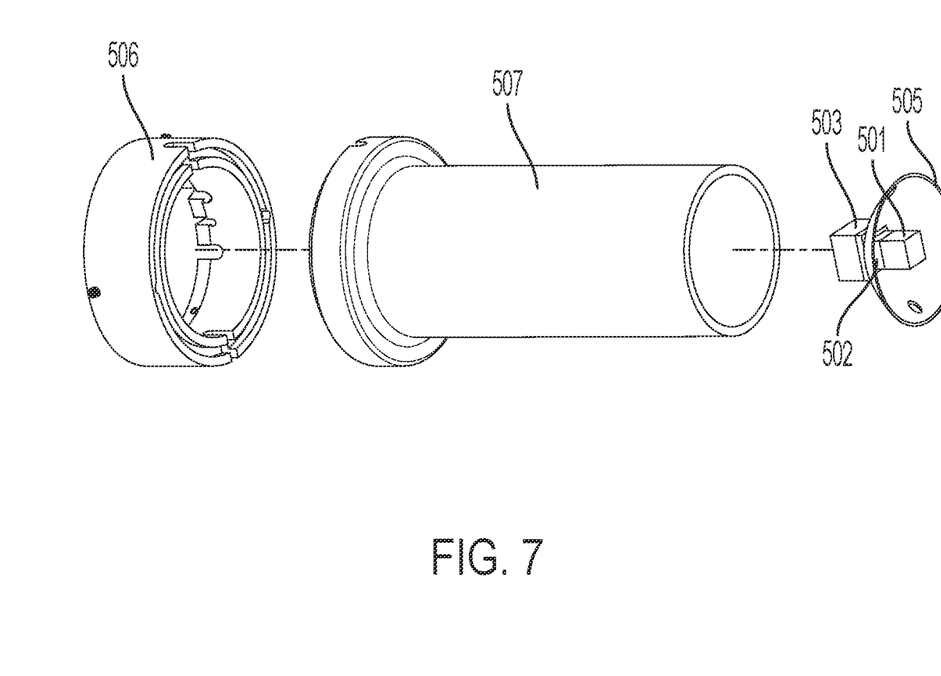
FIG. 7 is an exploded view containing the concealment or light funnel.

Details on the vacuum chamber lid (200) are now provided. The lid underside is processed according to the standard vacuum chamber methods to make a vacuum-tight seal with the associated gasket or sealing face (104) (see FIG. 2) on the vacuum chamber body (100). Knobs (207) are used to clamp the lid (200) to the sealing face (104) in the present embodiment, although any other method of forming a seal may be used. The lid as presented contains three viewports. The first central viewport (202) is aligned over the sample stage (500) when sealed to the vacuum chamber body (100). When laser light interacts with the sample (501) (see FIG. 7), photons are either upconverted or downconverted to higher or lower energy photons. These photons are emitted in all directions inside the sample stage chamber (500), which in turn are reflected upward through the central viewport (202). A light meter (205) is placed above the central viewport (202) to measure photon energy distribution and count. Energy and output power output from the sample can be calculated. When compared to laser light absorbed into the sample, the amount of heat removed or added into the sample can be determined.

The other two viewports (203, 204) are off center, in line with one another and the central viewport (202). The off-center viewports (203, 204) are for laser light input (601) and output (603), and are positioned over mirrors (604 and 605) inside the vacuum chamber (100). Details of the general arrangement of mirrors and the sample chamber are shown in the exploded view of FIG. 6. Either viewport may serve as the input viewport (203) while the other is the output viewport (204). A laser may be attached to the lid or introduced from a table or other stand and directed into the input viewport (203). The laser is directed internally with the mirror under the input viewport (203) into the sample chamber (500). Details of the sample chamber (500) are shown in the exploded view of FIG. 7. A portion of the laser light is absorbed and interacts with the enclosed sample (501). The remainder (603) passes through the sample, into the mirror (605) under the output port (204), and directed up through said viewport (204). A light meter (205) is placed above the output viewport (204) to measure laser photon energy, power and counts for all photons transmitted through the sample (501). Laser input (601) can be measured by running the apparatus with no sample loaded; the output laser (603) will equal 100% transmission through the sample (501).

After loading the sample and running the apparatus again, the transmission will decrease, causing output laser power (603) to be less than the input laser power (601). The difference is the amount of laser power absorbed into the sample (501). Of the absorbed photons, some or all of the energy will combine with sample thermal energy (in the form of phonons) and cause emission of higher energy photons. This causes a net decrease of thermal energy from the sample, resulting in cooling. Some or all of the absorbed photon energy may not combine with sample phonons, but instead dissipate into the sample, increasing thermal energy in the sample, causing a net heating effect. Which effect dominates is precisely dependent on the sample and input laser wavelength; description of this effect is outside the scope of this disclosure.

The temperature control system consists of the following parts: the compressor (not shown), the cold finger (401) and the heater (402). The compressor is outside the vacuum chamber (100) and cools a working fluid, such as liquid helium, to cryogenic temperatures. The fluid is circulated through coolant lines into the cold finger (401) according to standard cryogenic pump design. The coolant loop is entirely sealed from the vacuum chamber volume surrounding the cold finger; at no point does the cryogen enter the vacuum chamber. The cold finger platform cools to the lowest equilibrium temperature possible with the compressor, approximately 10-20 K with most liquid helium cryogenic compressors; often, this is not desirable. Rather, a higher cryogenic temperature, particularly 77 K (boiling point of liquid nitrogen) is more relevant. The heating element (402) is attached to the cold finger underside. The heating element (402) may consist of one or several heating elements wired in series or parallel, as desired. Leads are connected to an electrical feedthrough for feeding electrical current, heating the cold finger. This counterbalances the compressor, raising the cold finger (401) temperature. By controlling the heating element power, the temperature can be raised to any higher cryogenic temperature.

Figure 8:
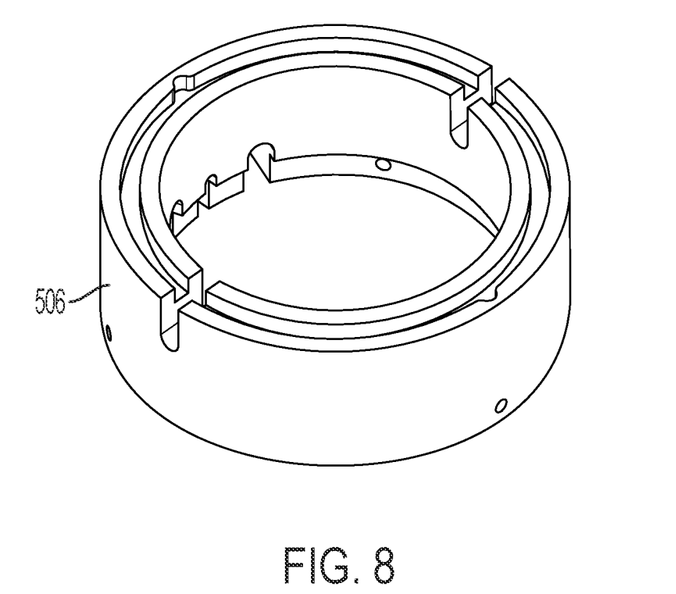
FIG. 8 is an isometric view of the sample chamber collar from the top.
Figure 9:
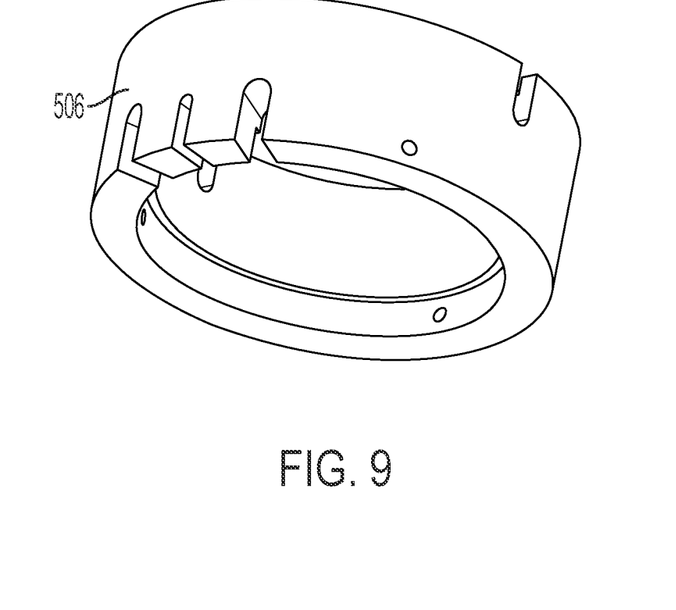
FIG. 9 is an isometric view of the sample chamber collar from bottom.
Figure 10:
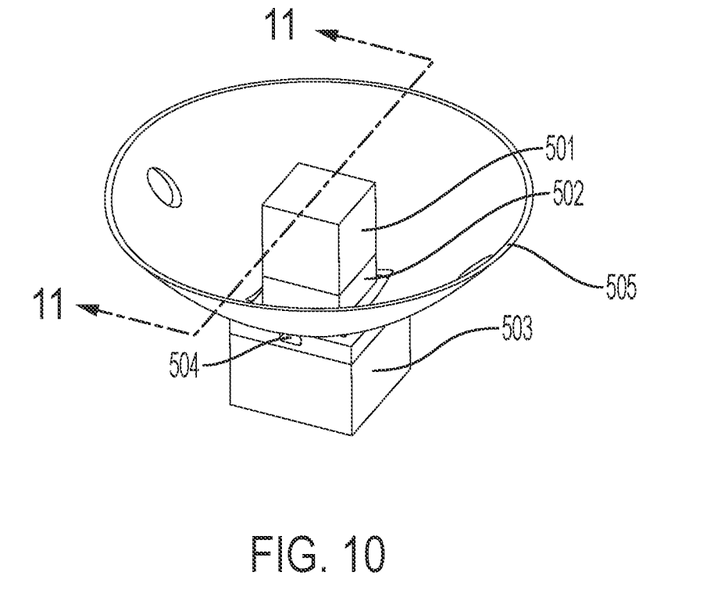
FIG. 10 is an isometric view of the sample components, including the sample itself.
Figure 11:
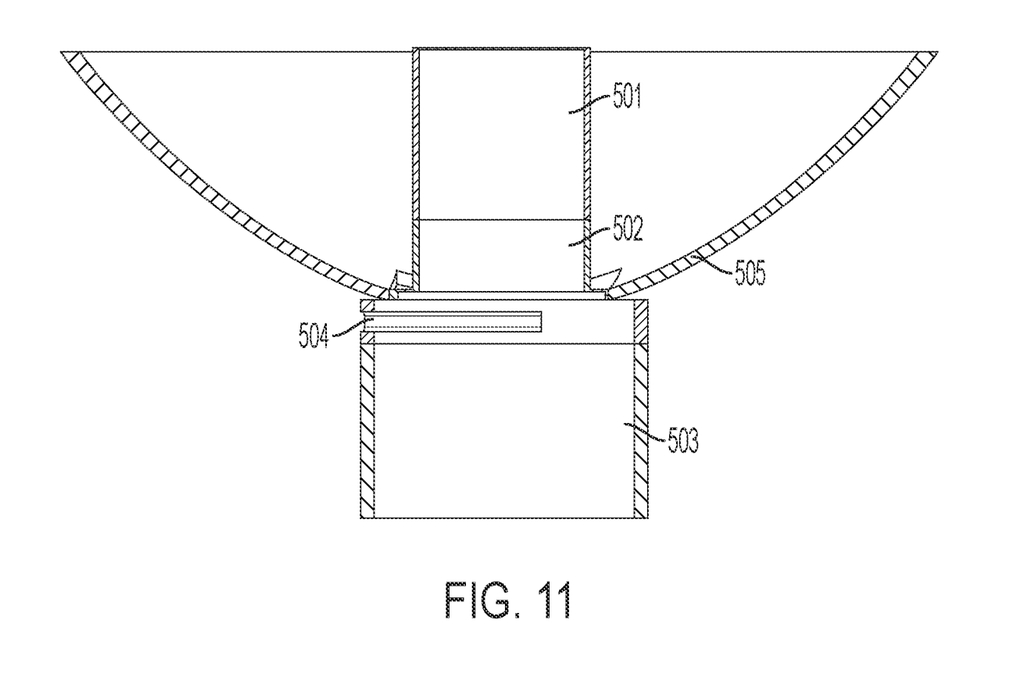
FIG. 11 is a sectional view of the sample components, including the sample itself.

Now referring to FIGS. 7-11, the sample stage setup is described. The stage consists of the sample (501), the sample block (502), the insulator (503), the sample block temperature diode (504) (see FIG. 10), the parabolic mirror (505), the cold finger temperature diode (508), the collar (506) and the light funnel (507). Details of the collar (506) are shown in FIGS. 8 and 9. The sample (501) may be any object under test (OUT), and may be transparent or opaque. Now referring to FIGS. 10 and 11, the details of the sample stage setup are shown. The sample (501) sits atop the sample support block (502), which in turn sits atop the insulator block (503), which in turn sits atop the cold finger (401). The sample support block (502) is thermally conductive and contains a small hole for a temperature diode (504). This diode measures the sample temperature independently of the cold finger; any laser-induced temperature changes will be measured through this diode. The underlying insulator block (503) has a high thermal resistance and may be made of silica aerogel. High thermal resistance is necessary to prevent any laser-induced temperature effects from being quickly overwhelmed by the cold finger (401), as the compressor is likely much more powerful than any laser. While the temperature will equilibrate after the laser is turned off, the insulator block (503) will slow this process, enabling accurate measurement of the laser's effects.

The laser interactions with the sample are described above (FIG. 6, 602). After these interactions, the emitted light from the sample may travel in any direction. Some will have an upward component, towards the central viewport (FIG. 1, 202). Others will have a downward component. All emitted light must be directed towards the central viewport (202) for accurate measurement by the light meter (206). The parabolic reflector (505) is curved such that all light, no matter the incident angle, is directed straight upward, toward the central viewport (202). A collar (506) is secured to the cold finger (202) platform, which in turn supports a light funnel (507). The funnel is a hollow cylinder polished to maximum reflectivity on the inside. Both the collar (506) and funnel (507) may be made of aluminum. The collar (506) and funnel (507) form the enclosure to the sample chamber and may have any number of apertures or holes for feeding a laser or diode wires into the sample chamber. Details on the collar (506) for the case of laser cooling are given in FIGS. 8 and 9. This includes apertures for the sample block (502) diode and another temperature diode (508) secured to the cold finger (401) platform. The diode is placed beneath the parabolic reflector (505) but within the collar (506) inner diameter, and may be secured to the platform with tape or cryogenic adhesive. Such a diode is for necessary comparison to the sample diode (504); measurement of laser-induced temperature effects requires it. If all the sample stage components reach thermal equilibrium at the compressor's (401) lowest possible temperature, then any laser-induced effects will disturb this equilibrium. Due to the insulator (503), the diodes will experience the temperature change at different rates and times. Thus, the pair of diodes is crucial to measuring the laser cooling or heating effects.

Use of the invention is similar to many vacuum chamber systems. The disclosed invention must be vented to atmosphere to allow removal of the lid (200) from the bell jar (100). After removing the lid, the light funnel (507) may be removed from the collar (506) to open the sample chamber. Only the sample (501) is exchanged, if an existing sample is already inside the chamber. The other components are untouched. After placing the new sample (501) on the sample block (502), the light funnel (507) is replaced atop the collar (506). The lid (200) is replaced on the bell jar (100) and the system evacuated again for operation. Upon reaching sufficient vacuum with the pumping system, the cryogenic compressor is activated, according to startup procedures appropriate for the model cryogenic pump and compressor utilized. This will cool the cold finger and test platform to the minimum possible temperature.

As mentioned above, the disclosed invention is highly reconfigurable for many test stands, feed throughs, and even lids. Therefore, operation will depend on the test and system customization. For the disclosed invention, a laser cooling setup is used as an example. Use of this particular setup is as follows. The cryogenic compressor will cool the cold finger to the minimum temperature possible for the cryogenic hardware and test platform. Higher cryogenic temperatures are accessible by heating the attached heating elements with a power supply. After the sample equilibrates at the desired temperature, the laser can be activated. The beam passes through the introduction viewport (203) and reflects off the first mirror (604). The reflected beam into the sample chamber and into the sample (501). The laser light either transmits through or is absorbed into the sample. The sample then re-emits the light into the sample chamber (500), which is redirected upward through the central viewport (206). Transmitted light exits the sample chamber and reflects off the second mirror (605), up into the laser exit viewport. Transmitted light meters at the central (206) and laser exit (205) ports measure the power transmitted through the sample and the power emitted from the sample. A temperature diode (504) inside the sample block (502) measure the temperature changes from the laser interaction with the sample (501). Between the power and temperature measurements, the net laser heating or cooling efficiency and rate can be calculated.

The previously described versions of the present invention have many advantages including ready adaptation from commercially-available cryogenic pump equipment, easy reconfiguration of the cold finger stage for measuring physical properties at cryogenic temperatures and versatility in test stand location (no specialized facilities are necessary).

While we have shown and described several embodiments in accordance with our invention, it should be understood that the same is susceptible to further changes and modifications without departing from the scope of our invention. Therefore, we do not want to be limited to the details shown and described herein but intend to cover all such changes and modifications as are encompassed by the scope of the appended claims.

What is claimed is:

1. A cryogenic property test platform for testing physical properties of samples at cryogenic temperatures, comprising:
    a vacuum chamber including body and lid and the lid including an introduction viewport, an exit viewport, and a centered viewport;
    a frame including a plurality of rods and a plurality of rings secured to the plurality of rods, wherein the frame fits within the body;
    a cold finger having a column, no charcoal arrays, and an internal cryogen loop;
    band heaters attached to the column;
    a sample stage in alignment with the center viewpoint and including a sample block for a sample to be placed thereon and the sample block having a hole therein, an insulator adjacent the sample block and in contact with the cold finger, a parabolic mirror to direct light through the center viewport, a cold finger temperature diode inserted into the hole, a collar, and a light funnel between the collar and the insulator block, wherein both the collar and funnel have apertures to permit a second diode to be placed in the chamber and measure temperature effects in comparison to the cold finger temperature diode;
    a first mirror and second mirror both secured to one of the rings on the frame, wherein the first mirror is positioned to reflect a laser beam passing through the introduction viewport into a sample on the sample block and then reflecting off the second mirror into passing through the exit viewport; and
    a first light meter positioned above the centered viewpoint and a second light meter positioned at the exit viewpoint to measure the power transmitted through the sample and the power emitted from the sample, respectively.

\* \* \* \* \*